(12) United States Patent
Wustefeld et al.

(10) Patent No.: US 9,140,820 B2
(45) Date of Patent: Sep. 22, 2015

(54) OPTICAL SENSOR AND TEST METHOD FOR TESTING THE OPERABILITY OF AN OPTICAL SENSOR

(71) Applicant: SICK AG, Waldkirch/Breisgau (DE)

(72) Inventors: Martin Wustefeld, Sexau (DE); Robert Bauer, Emmendingen (DE)

(73) Assignee: Sick AG, Waldkirch/Breisgau (DE)

( * ) Notice: Subject to any disclaimer, the term of this patent is extended or adjusted under 35 U.S.C. 154(b) by 333 days.

(21) Appl. No.: 13/773,759

(22) Filed: Feb. 22, 2013

(65) Prior Publication Data
US 2013/0221207 A1 Aug. 29, 2013

(30) Foreign Application Priority Data

Feb. 24, 2012 (EP) .................................. 12001225

(51) Int. Cl.
| | |
|---|---|
| *G01V 8/10* | (2006.01) |
| *G01B 11/14* | (2006.01) |
| *G01S 17/02* | (2006.01) |
| *G01S 17/06* | (2006.01) |
| *G01S 7/497* | (2006.01) |

(52) U.S. Cl.
CPC *G01V 8/10* (2013.01); *G01B 11/14* (2013.01); *G01S 7/497* (2013.01); *G01S 7/4972* (2013.01); *G01S 17/026* (2013.01); *G01S 17/06* (2013.01)

(58) Field of Classification Search
CPC ................................ G01B 11/14; G08B 13/18
USPC ............. 250/221, 222.1, 234, 236; 356/5.01, 356/614, 623; 340/551
See application file for complete search history.

(56) References Cited

U.S. PATENT DOCUMENTS

| | | | |
|---|---|---|---|
| 5,187,361 A * | 2/1993 | Ishii ........................... | 250/222.1 |
| 5,455,669 A | 10/1995 | Wetteborn | |
| 6,812,450 B2 | 11/2004 | Hipp | |
| 7,570,361 B2 | 8/2009 | Schneider et al. | |
| 2003/0075675 A1 | 4/2003 | Braune et al. | |
| 2012/0032800 A1 | 2/2012 | Klein | |
| 2012/0218564 A1 | 8/2012 | Wustefeld et al. | |

FOREIGN PATENT DOCUMENTS

| | | |
|---|---|---|
| DE | 39 08273 C1 | 5/1990 |
| DE | 43 45 448 C2 | 7/1998 |

(Continued)

OTHER PUBLICATIONS

European Search Report in Application No. 12001225.7 of Aug. 14, 2012, three pages.

*Primary Examiner* — Kevin Pyo
(74) *Attorney, Agent, or Firm* — Nath, Goldberg & Meyer; Jerald L. Meyer; Rury L. Grisham

(57) ABSTRACT

The invention relates to a test method for testing the operability of an optical sensor for monitoring a monitored zone in which at least one test object is used which is located in a detection zone of the sensor including the monitored zone. Provision is made in accordance with the invention that the test object is changed during the carrying out of the test method with respect to its position, alignment or its optical properties and produces a test signal when the change cannot be detected in the expected manner. The invention further relates to an optical sensor for monitoring a monitored zone, wherein the test method in accordance with the invention can be used.

23 Claims, 5 Drawing Sheets

(56) References Cited

FOREIGN PATENT DOCUMENTS

| | | |
|---|---|---|
| DE | 198 00 968 C2 | 7/1999 |
| DE | 103 13 194 B4 | 10/2004 |
| EP | 1 239 301 A1 | 9/2002 |
| EP | 1 980 871 B1 | 10/2008 |
| EP | 2 003 471 A1 | 12/2008 |
| EP | 2 053 538 A1 | 4/2009 |
| EP | 2 394 882 A1 | 12/2011 |
| GB | 1152567 A | 5/1969 |
| WO | 2008/113783 A2 | 9/2008 |

* cited by examiner

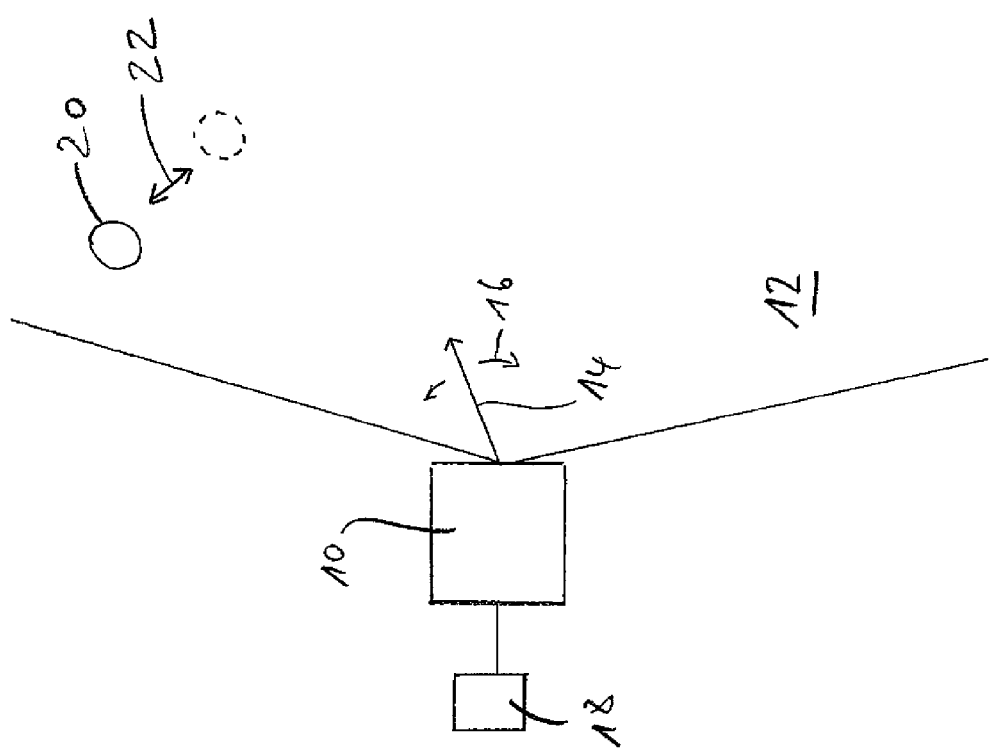

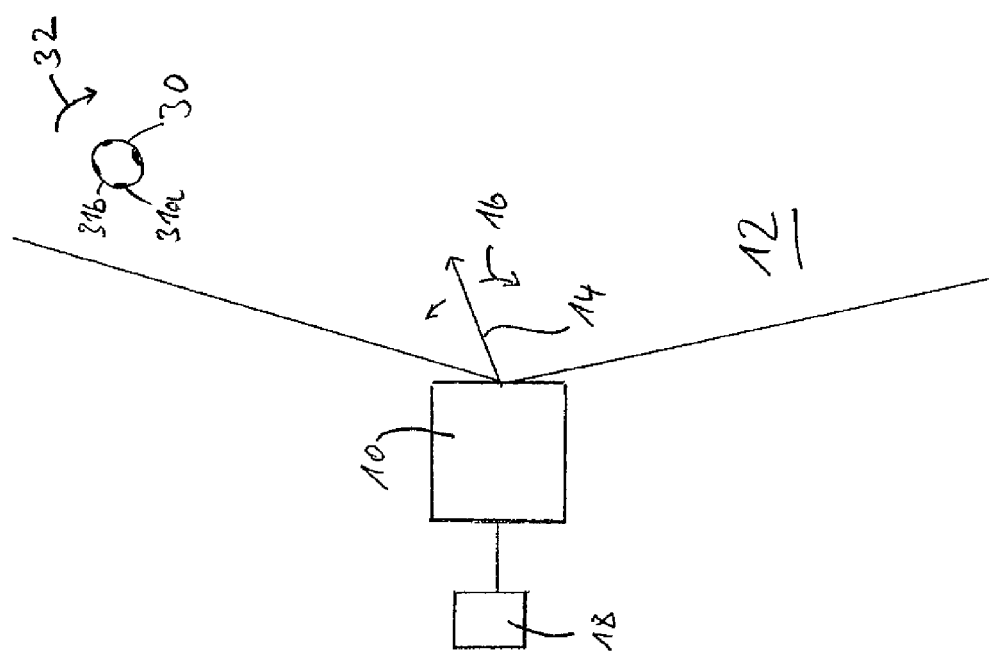

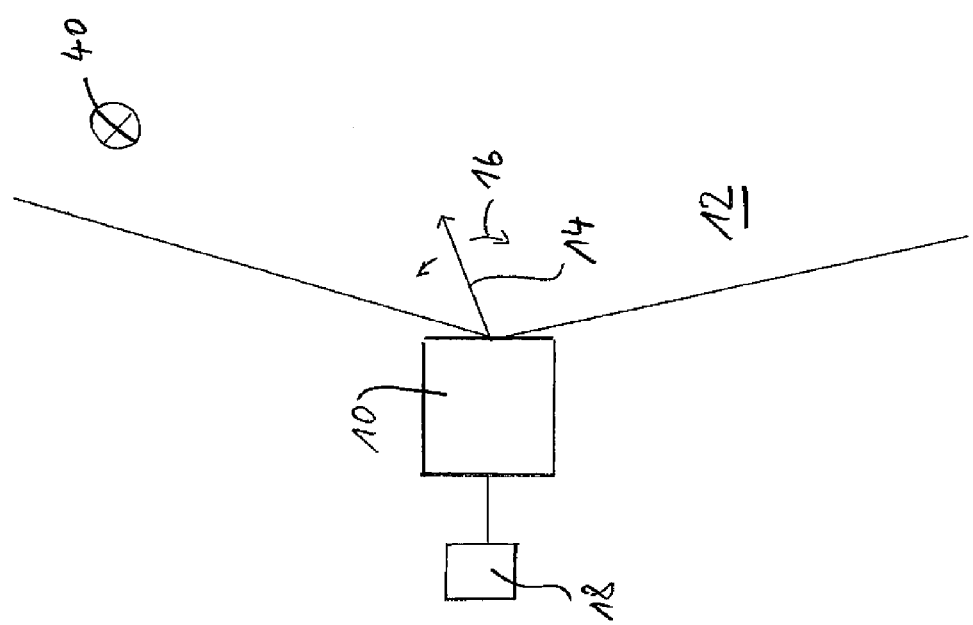

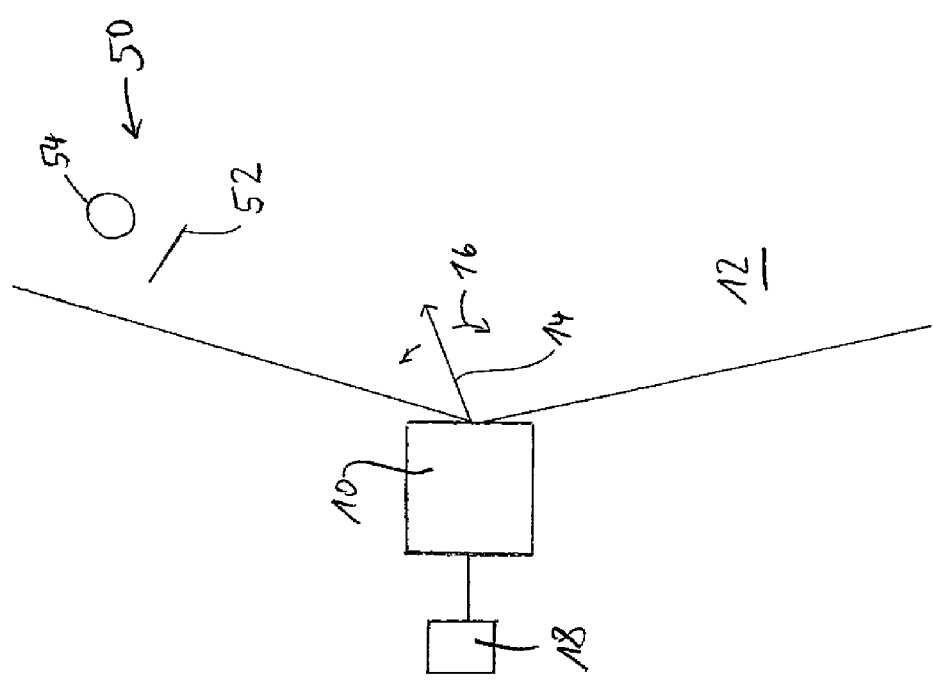

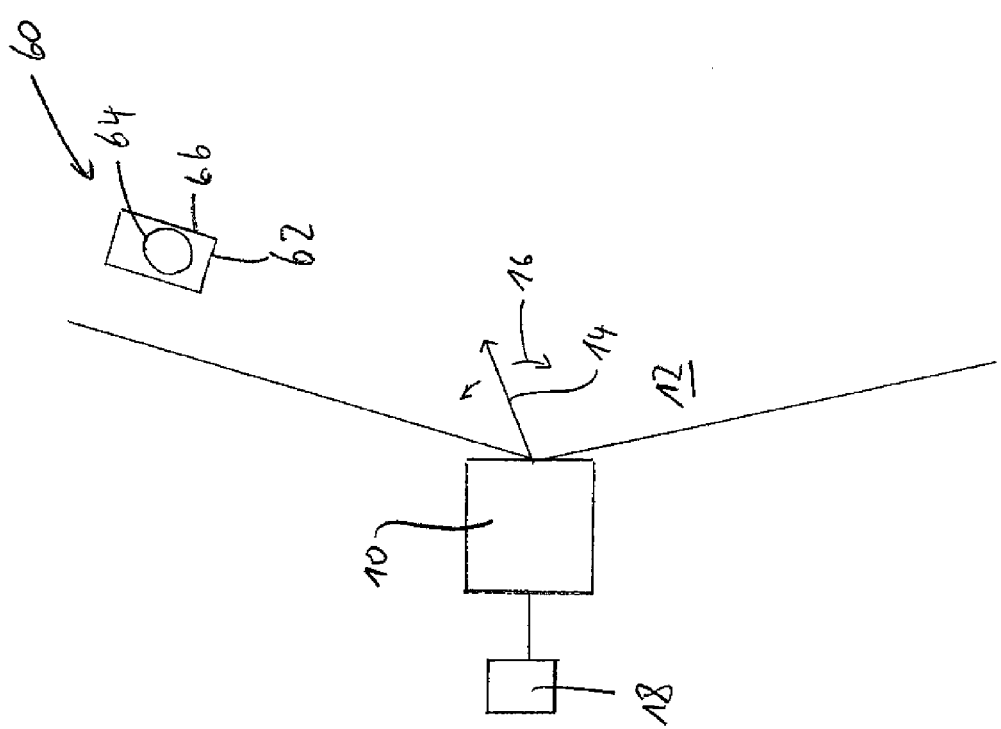

OPTICAL SENSOR AND TEST METHOD FOR TESTING THE OPERABILITY OF AN OPTICAL SENSOR

BACKGROUND

Technical Field

The invention relates to a test method for testing the operability of an optical sensor for monitoring a monitored zone in which at least one test object is used which is located in a detection zone of the sensor including the monitored zone. The invention further relates to an optical sensor for monitoring a monitored zone having a detection device for observing a detection zone including the monitored zone and having at least one test object within the detection zone.

Apparatus for object detection or object localization include e.g. light scanner systems, with laser scanners frequently being used. In this respect, a light beam generated by a laser is deflected via a light deflection unit of the scanner system into a protected zone and is reflected or remitted there by an object which may be present. The reflected or remitted light moves back to the scanner system again and is detected by a receiver there. The light deflection unit is frequently designed to be pivotable or rotatable such that the light beam generated by the laser sweeps over a detection zone generated by the pivot movement. If a reflected light signal received by the receiver is received from the monitored zone, a conclusion can be made on the angular position of the object in the protected zone from the angular position of the deflection unit.

If the time of flight, e.g. the time of flight from the—e.g. pulsed—laser light is additionally monitored, a conclusion can also be drawn on the distance of the object from the laser scanner from the time of flight using the speed of light. Two dimensional protected fields can e.g. be monitored completely in this manner. A deflection in a further spatial direction or a use of a plurality of such scanners with protected fields arranged in fan shape also allow the monitoring of a three-dimensional space.

Such systems are used e.g. in driverless transport systems to avoid collisions. Other applications relate e.g. to machines in which a danger zone has to be monitored which may not be infringed by an operator in the operation of the machine. It can in this respect e.g. be a robot working zone. If the presence of an unpermitted object—that is, for example, a leg of an operator—is detected in the danger zone with the help of the laser scanner, an emergency stop of the machine is effected.

Such scanner systems are e.g. described in DE 39 08 273 C1 or EP 1 980 871 B1.

Optical sensors can, on the other hand, also be distance-measuring sensors which draw a conclusion on the distance e.g. from the light duration a light signal irradiated into a monitored zone requires back to the sensor again after reflection at an object in the monitored zone.

The above-described systems often have photodiodes or photodiode arrays as receivers. Camera-based receivers are, however, also known.

A monitoring of the most important power functions is necessary for checking the operability, in particular of the reliable object detection and object localization by a safety system.

EP 2 394 882 A1 describes a radar scanner, for example, for monitoring a rail track, wherein an object, here a barrier, for example, is introduced into an observed zone and the image then scanned is compared with an image previously scanned without the object. It is checked in this manner whether the scanner correctly detects the introduced object so that a statement is possible on its operability.

It is advantageous if the safety can be permanently ensured by a suitable testing.

SUMMARY OF INVENTION

The object of the present invention is to provide the further improvement and increase in the safety of a test method for testing the operability of an optical sensor and to provide a correspondingly configured optical sensor. This object is satisfied by a test method having the features of claim 1 or an optical sensor having the features of claim 9. Dependent claims are directed to preferred embodiments and aspects.

In accordance with the invention, at least one test object is used which is located in a detection zone of the sensor including the monitored zone of the sensor. The monitored zone is in this respect that zone which should be monitored using the sensor. The detection zone of the sensor is in this respect that region which can actually be detected by the sensor. In this respect, the test object in the test method in accordance with the invention is always located in the detection zone of the sensor so that it can be seen by it.

Provision is made in accordance with the invention that the test object is changed during the carrying out of the test method with respect to its position in the detection zone, its alignment or its optical properties. This change is monitored in the test method in accordance with the invention. For this purpose, either a comparison with a previous observation is carried out after the change which was made e.g. in a previous test run and was stored. This test can, for example, be repeated periodically and then ensures a permanent functional test. In an alternative embodiment, the test object is observed during the change and a conclusion on the operability of the sensor is drawn from the course of the observed change.

The method in accordance with the invention is therefore characterized in that a dynamic test object is used and not only the presence or measurability of the test object is monitored, but rather also its change.

A conclusion can accordingly be drawn on the operability of the sensor from the observation of the change of the test object. If the observation does not correspond to the expected result, a test signal can be output, for example an alarm signal to a user or a stop signal for a machine or for a vehicle.

It is generally possible that the detection zone and the monitored zone of the sensor do not coincide. Provision can thus e.g. be made with driverless transport systems that the dynamic test object is moved together with the vehicle and is located in the detection zone of the sensor for testing the operability thereof. The monitored zone of the sensor, in contrast, includes e.g. the space in front of the vehicle. The scanner then detects a detection zone including the test object on the vehicle and the space (the monitored zone) in front of the vehicle. In other applications, e.g. with stationary machines with a danger zone to be secured, it may be advantageous, on the other hand, if the test object is located in the monitored zone.

The test method in accordance with the invention can be used in various sensor systems, e.g. in distance measurement systems, two-dimensional or three-dimensional scanners, camera-based sensors or sensors based on the time of flight of light.

The observation step of the method in accordance with the invention can e.g. include the detection of an optical property of the test object to carry out the test method. In a preferred further development, a light signal can thus e.g. be transmitted into the monitored zone and the light signal reflected or remitted by the test object can be evaluated. If e.g. the observable reflection pattern of the test objet is varied in a manner still to be described, the detected change can be evaluated to recognize whether it corresponds to the expected change and the test object has been correctly recognized in this respect.

A possibility to change the test object is to move, e.g. displace, the test object within the detection zone. An evaluation of the observed position change produces information on whether it corresponds to the position change actually carried out in order thus to obtain information on the operability of the sensor. Such a test method additionally also allows the determination whether the sensor correctly measures a displacement of an object so that not only the detection of an object is ensured using such a test method, but rather also the capability of the sensor to correctly determine a positional change.

Another embodiment provides that a test object, which is not the same from all sides, is rotated during the carrying out of the test method. A time pattern of the reflectivity arises by the rotation. An evaluation of this time extent and a comparison with an expected extent in turn provides reliable information on the operability of the sensor.

An advantageous further development of this embodiment provides that the test object is continuously rotated and to this extent a periodic change of the optical properties, e.g. of the reflectivity, can be observed and evaluated.

The test object is active in another embodiment in that it has a light source which is switched on or off to change the test object. Such a change can e.g. also take place periodically and the periodic signal measured by the sensor at the site of the test object can be compared with the expected signal to be able to reliably determine the operability of the sensor.

A further advantageous embodiment provides that the at least one test object has a diaphragm with which e.g. a light source can be masked such that it no longer illuminates the receiver of the sensor. A simple embodiment e.g. provides the use of a liquid crystal shutter (LCD shutter) as a diaphragm. Opening and closing the diaphragm and observing the test object with the optical sensor allows the determination whether the sensor is working correctly in a reliable manner.

An optical sensor in accordance with the invention for monitoring a monitored zone has a detection device for observing a detection zone which includes a monitored zone of the sensor. At least one test object is provided within the detection zone.

In accordance with the invention, the optical sensor includes a change device for changing the position of the at least one test object in the detection zone, the alignment or the optical properties of the at least one test object. An evaluation device is provided with whose aid a signal of the detection device can be evaluated and a test signal can be produced in dependence on the observable change of the test object. An optical sensor in accordance with the invention therefore allows the carrying out of the optical test method in accordance with the invention in that the test object is observed during its change with the aid of the detection device and the observed signal is compared with the expected signal. Non-coincidence of the observed signal and of the expected signal results in the production of a test signal as already described above.

The optical sensor itself can e.g. be a two-dimensional or three-dimensional scanner or a distance measurement system which works according to the principle of the time of flight of light.

The advantages of the optical sensor in accordance with the invention result from the advantages already described above for the test method which can be carried out with it.

Special embodiments of the optical sensor in accordance with the invention result from the above description of the particularly preferred aspects of the test method in accordance with the invention. The optical sensor in accordance with the invention in accordance with preferred embodiments can in particular have a device for moving the at least one test object, e.g. for its displacement within the detection zone or for its rotation.

Other embodiments provide that the test object includes a light source which can be switched on or off by a corresponding change device. Another embodiment provides that the test object includes a diaphragm and the change device of the optical sensor in accordance with the invention is configured to open or close the diaphragm.

It is possible both with the test method in accordance with the invention and with the optical sensor in accordance with the invention to combine in an advantageous manner the described embodiments and aspects with (i) a displaceable and/or (ii) rotatable test object which is (iii) additionally configured as a light source and/or (iv) can be masked and/or (v) with a test object which can be changed in another manner. A plurality of test objects of the same type or of test objects working in accordance with different aspects can also be used.

The invention will be explained in detail with reference to the enclosed schematic Figures which show different embodiments. In this respect, the Figures are not to be understood as true to scale. There are shown

BRIEF DESCRIPTION OF THE DRAWINGS

FIG. 1 an embodiment in accordance with the invention of an optical sensor with a displaceable test object;

FIG. 2 an embodiment in accordance with the invention of an optical sensor with a rotatable test object;

FIG. 3 an embodiment in accordance with the invention of an optical sensor with a test object which includes a light source;

FIG. 4 an embodiment in accordance with the invention of an optical sensor which includes a diaphragm; and FIG. 5 a modified embodiment in accordance with the invention of an optical sensor with a test object with a diaphragm.

DETAILED DESCRIPTION

The aspects shown in the Figures each relate to scanner systems for monitoring a protected zone, e.g. for unpermitted objects. It can e.g. in this respect be a scanner system which monitors the danger zone of a machine, e.g. of a press brake. If an unpermitted object, e.g. a limb of an operator, is located in the danger zone of the machine, this must be detected by the optical sensor and a corresponding signal must be output to an operator or a stop signal to the machine.

The Figures respectively show such a scanner system 10 which transmits a light signal 14 into a detection zone 12. The light beam 14 is periodically deflected in a manner known per se in the direction of the arrow 16 to carry out the scanner function. The signal of the scanner system 10 is evaluated with the aid of an evaluation unit 18.

In accordance with the invention, one or more test objects are used to check the operability of the scanner system and can be observed using the scanner system 10.

FIG. 1 thus shows a test object 20 which can be displaced in the direction 22. The movement of the test object 20 in direction 22 means a dynamizing of the test object 20. The signal of the scanner signal 10 can be examined as to whether the detected movement of the test object 20 corresponds to the actually carried out movement which is effected e.g. by a corresponding displacement device and is known.

Such a system allows the check of the operability of the optical sensor, on the one hand. If the measured signal does not correspond to the set movement of the test object 20, a stop signal is e.g. output to a machine which is monitored by the system. In addition, such an embodiment allows statements on whether and how precisely a positional change of an object in the detection zone 12 can be detected.

FIG. 2 shows another embodiment in which the test target 30 has dark and light regions 31a and 31b respectively. The test object therefore has regions of different reflectivity. If the test object is rotated in the direction of the arrow 32, a periodically changing reflectivity pattern arises in this manner. It can be detected using the scanner system 10 and the correct operability can thus be checked.

If the measured periodic signal e.g. does not correspond to the rotational speed or if it cannot be detected at all, a malfunction of the scanner is obviously present.

FIG. 3 shows another embodiment in which the test object 40 includes an illumination source. The illumination source 40 can be switched on and off and the switching on and off process can be monitored using the scanner system 10. If the observed signal does not correspond to the expected signal, there is again obviously a malfunction of the sensor. It is also possible here to carry out a periodic switching on and off so that the scanner system 10 can e.g. monitor the frequency.

FIG. 4 describes an embodiment in which the test object 50 has an article 54 which is arranged behind a diaphragm 52. The article 54 can e.g. in turn be an illumination source. An opening and closing of the diaphragm 52 therefore changes the signal which can be detected by the scanner system 10.

In another aspect, the object 54 e.g. includes a reflective body which can be covered by a diaphragm 52 which is not designed as reflective. The reflection signal of the test object 50 which can be measured by the scanner 10 is changed here by opening and closing the diaphragm 52.

FIG. 5 describes a modification of such an aspect in which the test object 60 includes an article 64 which is arranged in a housing 66 whose side facing the scanner includes a diaphragm 62. The article 64 is additionally protected within the housing 66 here so that the contamination probability is smaller.

The diaphragm 52, 62 can include an LCD shutter both in the aspect of FIG. 4 and in the aspect of FIG. 5. In this manner, no mechanical change of the diaphragm position is necessary, but the diaphragm 52, 62 can rather be made permeable for light or can be masked with the aid of an electric signal.

The additional advantage thus in particular results in the aspect of FIG. 5 that a contamination-preventing atmosphere can be produced in the housing 66. The liquid crystal shutter (LCD shutter) acting as a front screen can e.g. be cleaned in a simple manner by ultrasound, by movement or with the aid of a "screen wiper". In addition, such a front screen designed as an LCD shutter can be configured so that it is only permeable for the wavelength of the transmission light of the scanner system 10 so that the influence of environmental light on the quality of the test is reduced.

Different parameters can be used for the test objects used in accordance with the invention. It is, however, e.g. advantageous if the size of the test target is in each case selected to be so large that it corresponds to the beam diameter of the scanner system 10 or the geometrical resolution of the sensor.

In addition, the observed size of the test target can be monitored as to whether it coincides with the actual size, which means an additional security in the function test of the sensor.

In the embodiments shown in the Figures, the test object is located in a monitored zone which can also correspond to the protected zone. In other aspects, the test object is in each case located in a region which is actually not monitored for the presence of disallowed objects by the scanner system 10, but nevertheless belongs to its detection zone so that the test object can be monitored.

The described embodiments can also be combined, with either a plurality of test objects being used which are changed in different ways or with a test object being able to be subjected to different changes, that is, for example, displaced and/or rotated and/or switched off, etc.

All embodiments of the optical sensor in accordance with the invention share the common feature that the test object can be changed for carrying out a test method in accordance with the invention and that the test object can be dynamically observed in this way.

REFERENCE NUMERAL LIST 10 scanner system
12 detection zone
14 scan beam
16 scan beam movement
18 evaluation device
20 displaceable test object
22 direction of displacement
30 rotatable test object
31a dark regions of the test object
31b light regions of the test object
32 direction of rotation
40 test object with light source
50 test object with diaphragm
52 diaphragm
54 article
60 test object with diaphragm
62 diaphragm
64 article
66 housing

The invention claimed is:

1. A test method for testing the operability of an optical sensor (10) for monitoring a monitored zone, wherein the sensor (10) has a receiver for object detection, wherein at least one test object (20, 30, 40, 50, 60) is used in the test method and is located in a detection zone (12) of the sensor (10) including the monitored zone, wherein
the at least one test object (20, 30, 40, 50, 60) is changed during the carrying out of the test method with respect to its position within the detection zone (12), its alignment or its optical properties,
the position within the detection zone is changed from an initial position to a predetermined displacement position;
the at least one test object (20, 30, 40, 50, 60) is observed (i) after the change for comparing with a previous observation and/or (ii) during the change with the aid of a detection device; and
at least one test signal is produced when the observed change does not correspond to the change carried out during the performing of the test method.

2. A test method in accordance with claim 1, wherein the detection device is the receiver of the sensor (10).

3. A test method in accordance with claim 1, wherein the observation step includes the detection of an optical property of the at least one test object (20, 30, 40, 50, 60).

4. A test method in accordance with claim 3, wherein the optical property is a reflection or remission.

5. A test method in accordance with claim 1, wherein the at least one test object (20, 30) is moved within the detection zone (12) to change the test object (20, 30).

6. A test method in accordance with claim 5, wherein the at least one test object (20) is displaced within the detection zone (12) to change the test object (20) and the positional change is observed.

7. A test method in accordance with claim 5, wherein a test object (30) is used which is not the same from all sides and the test object (30) is rotated to change it.

8. A test method in accordance with claim 7, wherein the test object (30) is rotated at least over a specific time period and the extent of the change is evaluated for the production of the test signal.

9. A test method in accordance with claim 1, wherein the at least one test object (40) has a light source which is switched on or off to change the test object (40).

10. A test method in accordance with claim 1, wherein the at least one test object (50, 60) has a diaphragm (52, 62) which is opened or closed for changing the test object (50, 60).

11. A test method in accordance with claim 10, wherein the diaphragm is a liquid crystal shutter.

12. An optical sensor (10) for monitoring a monitored zone, having
a detection device for observing a detection zone (12) including the monitored zone; and
at least one test object (20, 30, 40, 50, 60) with in the detection zone (12),
wherein the optical sensor further comprises:
a change device for changing an initial position in the detection zone (12), the alignment or the optical properties of the at least one test object (20, 30, 40, 50, 60), the initial position in the detection zone is changed to a predetermined displacement position; and
an evaluation device (18) for evaluating a signal of the detection device and for producing a test signal in dependence on the change of the at least one test object (20, 30, 40, 50, 60), wherein the evaluated signal does not correspond to the test signal.

13. An optical sensor in accordance with claim 12, wherein it is a two-dimensional or three-dimensional scanner (10).

14. An optical sensor in accordance with claim 12, wherein it is a distance measurement system.

15. An optical sensor in accordance with claim 14, wherein the sensor works in accordance with the principle of the time of flight of light.

16. An optical sensor in accordance with claim 12, wherein the detection device includes a camera.

17. An optical sensor in accordance with claim 12, wherein the detection device is configured such that it can detect the reflection or the remission of the test object.

18. An optical sensor in accordance with claim 12, wherein the change device includes a device for moving the at least one test object (20, 30).

19. An optical sensor in accordance with claim 18, wherein the change device includes a device for displacing the at least one test object (20).

20. An optical sensor in accordance with claim 18, wherein the change device includes a device for rotating the at least one test object (30) and the test object (30) is not the same from all sides.

21. An optical sensor in accordance with claim 12, wherein the at least one test object (40) includes a light source and the change device includes a device for switching the light source on and off.

22. An optical sensor in accordance with claim 12, wherein the at least one test object (50, 60) has a diaphragm (52, 62) and the change device has a device for opening or closing the diaphragm (52, 62).

23. An optical sensor in accordance with claim 22, wherein the diaphragm is a liquid crystal shutter.

* * * * *